United States Patent [19]
Uchiyama

[11] Patent Number: 4,875,698
[45] Date of Patent: Oct. 24, 1989

[54] POWER TRANSMITTING SYSTEM FOR A FOUR-WHEEL DRIVE VEHICLE

[75] Inventor: Shintaro Uchiyama, Tokorozawa, Japan

[73] Assignee: Fuji Jukogyo Kabushiki Kaisha, Tokyo, Japan

[21] Appl. No.: 154,744

[22] Filed: Feb. 10, 1988

[30] Foreign Application Priority Data

Feb. 19, 1987 [JP] Japan .................. 62-36628

[51] Int. Cl.$^4$ .............................................. B60K 17/34
[52] U.S. Cl. .................................. 180/233; 74/711; 180/247; 180/249; 192/58 B; 364/424.05
[58] Field of Search ............... 180/233, 247, 248, 249, 180/197; 192/48.2, 48.5, 49, 58 B, 54; 74/701, 711

[56] References Cited

U.S. PATENT DOCUMENTS

| | | | |
|---|---|---|---|
| 3,845,671 | 11/1974 | Sharp | 74/711 |
| 4,031,780 | 6/1977 | Dolan | 180/248 |
| 4,562,897 | 1/1986 | Renneker | 180/233 |
| 4,723,624 | 2/1988 | Kawasaki | 180/233 |

FOREIGN PATENT DOCUMENTS

| | | | |
|---|---|---|---|
| 205248 | 12/1986 | European Pat. Off. | 180/233 |
| 59-188731 | 12/1984 | Japan . | |
| 2163107 | 2/1986 | United Kingdom | 180/249 |

Primary Examiner—Mitchell J. Hill
Attorney, Agent, or Firm—Martin A. Farber

[57] ABSTRACT

A viscous coupling is provided in a power transmitting system for transmitting power of an engine to auxiliary driving wheels, and a lock device is provided for locking the viscous coupling so as to directly transmit the power to the auxiliary driving wheels. Driving torque of the engine is detected and compared with a predetermined driving torque and an output signal is produced when the detected driving torque exceeds the predetermined driving torque. An actuator responds to the output signal for operating the lock device to lock the viscous coupling.

8 Claims, 3 Drawing Sheets

POWER TRANSMITTING SYSTEM FOR A FOUR-WHEEL DRIVE VEHICLE

BACKGROUND OF THE INVENTION

The present invention relates to a system for transmitting the power of an engine to four wheels of a four-wheel drive vehicle and more particularly to a system provided with a viscous coupling for transmitting the power.

A four-wheel drive vehicle of the type in which a transfer clutch in a form of a dog clutch, hydraulic clutch or electromagnetic clutch is provided for transmitting the output torque of a transmission to auxiliary drive wheels is known. In such a vehicle, a power transmission system can be converted from a two-wheel drive system to a four-wheel drive system by engaging the transfer clutch. However, if a dog clutch is employed as a transfer clutch, the difference of speeds between front wheels and rear wheels cannot be absorbed when the clutch is engaged. Although a hydraulic clutch slips to absorb the speed difference, a complicated hydraulic control system must be installed.

Recently, a viscous coupling containing a high viscous fluid such as a silicon oil has been proposed as a transfer clutch. The viscous coupling operates to transmit the torque in proportion to the difference between input speed and output speed. The viscous coupling may either be used as a devise for locking a control differential, or be used as a transfer clutch which operates to transfer the torque to the auxiliary wheels to provide a four-wheel drive system when the auxiliary wheels skid. Moreover, the slipping in the viscous coupling prevents a tight corner braking at cornering.

Japanese Utility Model Application Laid Open No. 59-188731 discloses a power transmitting system for a four-wheel drive vehicle provided with a viscous coupling. A four-wheel driving mode or a two-wheel driving mode can be selected by connecting and disconnecting the transfer device. However, in the four-wheel driving mode, power is transmitted to the rear wheels while the viscous coupling slips so that the power transmitting characteristic and driveability of the vehicle decrease and the fuel consumption increases. Additionally, since temperature of the silicon oil contained in the viscous coupling rises as the result of the continuous slipping, the viscosity of the oil decreases. Thus, clutch torque becomes too small for increasing driveability on muddy and snowy rough roads.

In order to eliminate such drawbacks, it is preferable to lock the viscous coupling so as to directly connect the front and rear drive systems with each other. However, if the viscous coupling is adapted to be manually locked, the locking of the coupling is determined by the decision of a driver of the vehicle, which is disadvantageous to beginners.

SUMMARY OF THE INVENTION

The object of the present invention is to provide a power transmitting system having a viscous coupling and a lock system wherein the viscous coupling may either be operated as a transfer clutch or locked automatically so as to directly transmit torque to auxiliary wheels of a vehicle or transmit the torque through the viscous coupling.

According to the present invention, there is provided a power transmitting system for a four-wheel drive vehicle having an engine, and a transmission for transmitting power of the engine to main driving wheels, the system comprising a viscous coupling provided in a power transmitting system for transmitting the power to auxiliary driving wheels, a lock device provided for locking the viscous coupling so as to directly transmit the power to the auxiliary driving wheels, detector means for detecting driving torque of the power transmitting system, comparator means for comparing the detected driving torque with a predetermined driving torque and for producing an output signal when the detected driving torque exceeds the predetermined driving torque, an actuator responsive to the output signal for operating the lock device to lock the viscous coupling.

In an aspect of the invention, the lock device is provided to lock a housing of the viscous coupling to a shaft of the viscous coupling, and the actuator is a vacuum operated actuator having a chamber defined by a diaphragm.

The other objects and features of this invention will become understood from the following description with reference to the accompanying drawings.

DETAILED DESCRIPTION OF THE PREFERRED EMBODIMENT

Figure 1:
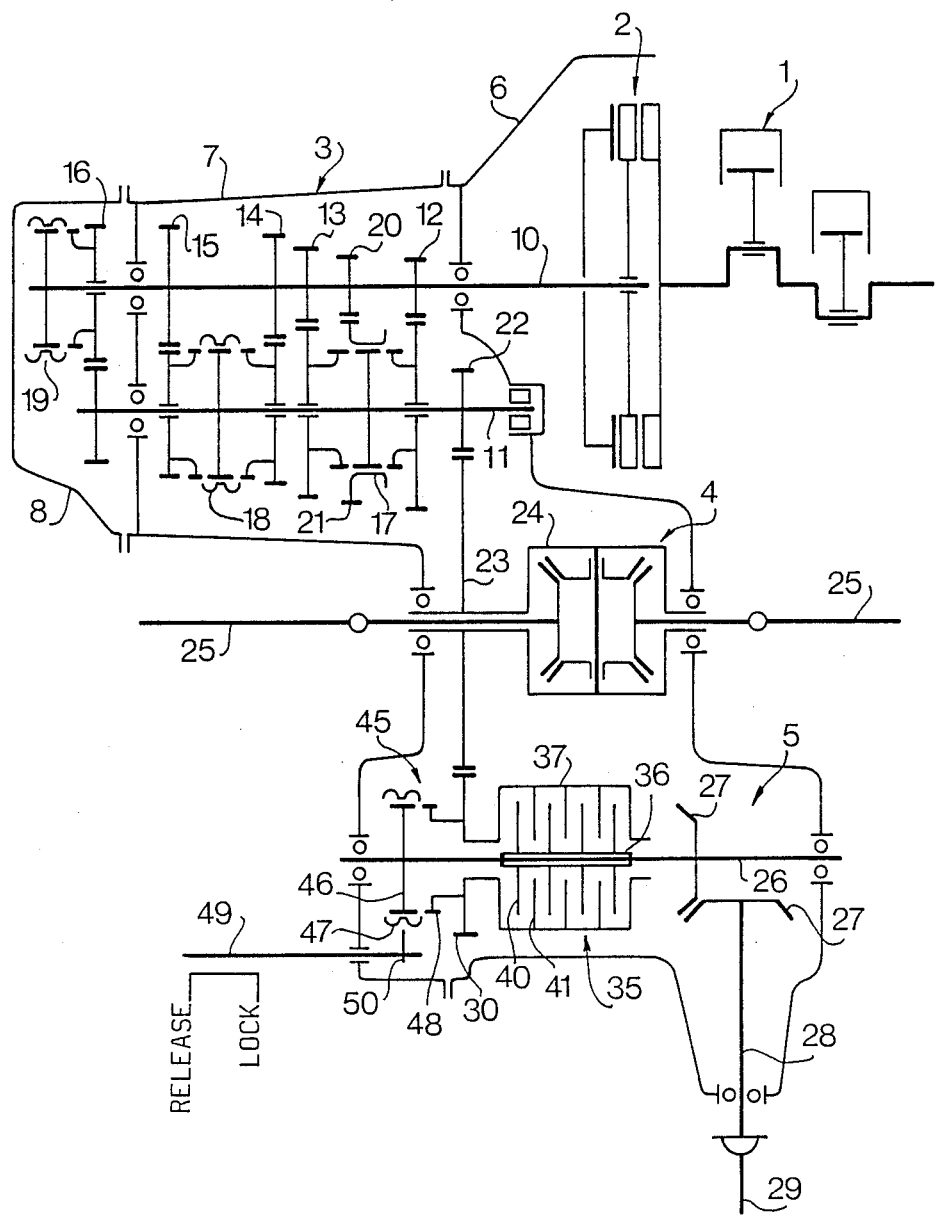
FIG. 1 is a schematic diagram of a four-wheel drive power transmission system of the present invention.

FIG. 1 shows a power transmission system for a four-wheel drive motor vehicle to which the present invention is applied. An engine 1 is laterally mounted on the motor vehicle at a front portion thereof. The power transmission system comprises a clutch 2 housed in a clutch housing 6, and a transmission 3 and transfer device 5 housed in a transmission case 7 and an extension case 8. The transmission 3 has an input shaft 10, five pairs of change-speed gear 12 to 16 corresponding to first to fifth (overdrive) speed gears, and synchronizers 17 to 19. The synchronizers 17 to 19 are disposed between the gears 12 and 13, between 14 and 15 and adjacent the gears 16, respectively. A reverse drive gear 20 mounted on the input shaft 10 meshes with a gear 21 formed on one side of a sleeve of the synchronizer 17 through an idler gear (not shown) for reverse drive.

A drive gear 22, which is securely mounted on the output shaft 11, meshes with a final reduction gear 23 having a large diameter and connected with a front differential 24 through a shaft, thereby forming final reduction device 4. The front differential 24 is connected to axle shafts 25 so as to transmit the power to front wheels of the vehicle.

The transfer device 5 comprises a lateral transfer shaft 26 and a viscous coupling 35 mounted on the shaft 26. The viscous coupling 35 is connected to the final reduction gear 23 through a transfer gear 30. The transfer shaft 26 is connected to a rear drive shaft 28 perpendicular to the transfer shaft 26 through a pair of bevel gears 27, thereby transmitting the power to rear wheels of the vehicle by way of a propeller shaft 29.

Figure 2A:
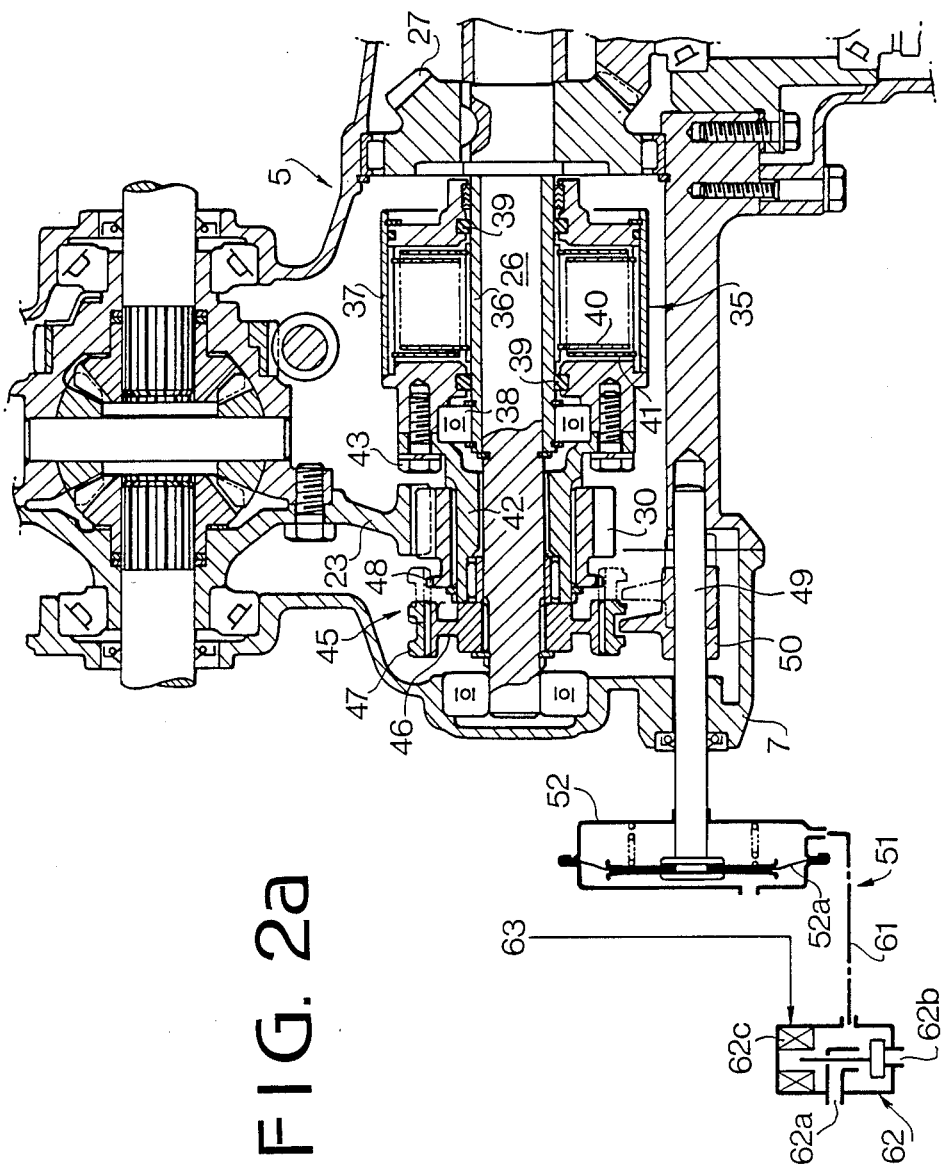
FIGS. 2a and 2b show a detailed sectional view of a viscous coupling and a locking device thereof and a block diagram of a control unit for controlling the locking device.
Figure 2B:
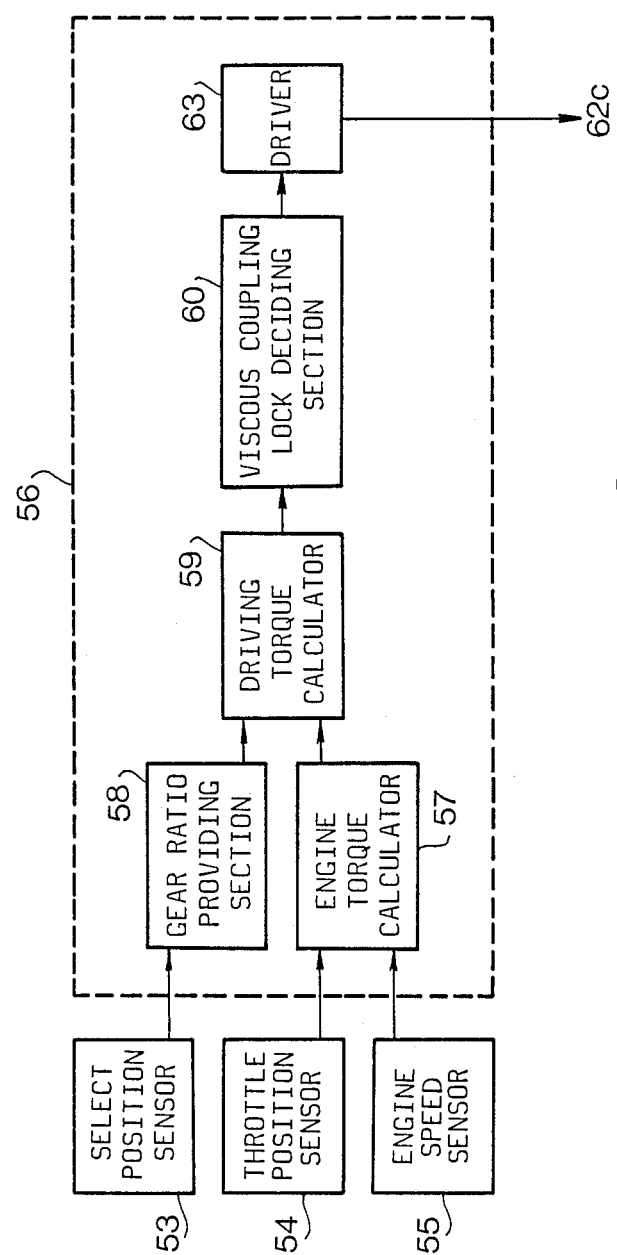

Referring to FIGS. 2a and 2b, the viscous coupling 35 comprises a hollow hub 36 mounted on the transfer shaft 26 through splines and a cylindrical housing 37 rotatably mounted on the hub 36 through a bearing 38. A high viscous fluid is contained in the housing 37 and sealed by a pair of oil rings 39. The hub 36 has a plurality of perforated inner discs 40 and the housing 37 has a plurality of perforated outer discs 41. The inner and outer discs are alternately arranged in the axial direction of the viscous coupling 35. The housing 37 is connected to the transfer gear 30 through a tubular shaft 42 which is rotatably mounted on the shaft 26 and fixed to the housing 37 by bolts 43. When there is a speed difference between the hub 36 and the housing 37, the viscous coupling operates to transmit the torque. The transmitting torque increases with increase of the difference. Thus, the torque is transmitted from a high speed disc side to a lower speed disc side.

Mounted on the transfer shaft 26 adjacent the transfer gear 30 is a lock device 45 for locking the hub 36 and the housing 37. The lock device 45 has the same construction as the synchromesh device. Namely it comprises a hub 46 mounted on the transfer shaft 26 through splines and a selector sleeve 47 slidably mounted on the outer periphery of the hub 46. The sleeve 47 is slidable in the axial direction of the shaft 26 so as to engage with outer teeth 48 of the transfer gear 30. The selector sleeve 47 is further engaged with a fork 50 which is securely mounted on a rail 49 disposed in parallel with the transfer shaft 26 and supported by the transmission case 7. The rail 49 is connected to a diaphragm 52a of a vacuum operated actuator 52 of an automatic changeover device 51 disposed outside of the transmission case 7. A chamber of the actuator 52 is communicated through a passage 61 with a solenoid operated valve 62 which is controlled by output signal of a control unit 56. The valve 62 has a port 62a opened to the atmosphere and a port 62b communicated with an intake passage of the engine to be applied with vacuum pressure, and a solenoid 62c.

The control unit 56 has an engine torque calculator 57 where engine torque $T_e$ is obtained, for example from a torque graph, in dependency on a throttle opening degree $\theta$ detected by a throttle position sensor 54 and an engine speed Ne detected by an engine speed sensor 55. The control unit 56 is further provided with a gear ratio providing section 58 which determines a gear ratio i in dependency on an output signal of a select position sensor 53. The select position sensor 53 detects which of the first to fifth and reverse gears is selected. The engine torque $T_e$ and the gear ratio i are applied to a driving torque calculator 59 which calculates a driving torque $T_D$ in accordance with the following equation.

$$T_D = T_e \times i \times IF/R$$

where IF is a final reduction gear ratio and R is a constant for effective radius of tires. The driving torque $T_D$ is applied to a viscous coupling lock deciding section 60 wherein the driving torque $T_D$ is compared with a predetermined lock torque $T_S$ which is obtained from a gripping force of tires. The deciding section 60 produces a lock signal when the driving torque $T_D$ is larger than the predetermined torque $T_S T_D > T_S$ so as to operate the solenoid operated valve 62 through a driver 63.

The operation of the present invention is described hereinafter.

The power of the engine 1 is transmitted to the transmission 3 through the clutch 2 and the input shaft 10 an further to the front wheels through output shaft 11, drive gear 22, final reduction gear 23, front differential 24 and axle shafts 25.

When the vehicle is driven on an ordinary road, the driving torque $T_D$, which is calculated by the calculator 59 dependent on the engine speed Ne, throttle opening degree $\theta$ and the gear ratio i, is smaller than the predetermined torque $T_S$ ($T_D \leq T_S$). Thus, a lock signal is not applied to the solenoid 62c of solenoid operated valve 62. Accordingly, the vacuum port 62b of valve 62 is closed as shown in FIG. 2a, so that the chamber of actuator 52 is opened to the atmosphere thereby retaining of valve 62 is closed as shown in FIG. 2a, so that the chamber the rail 49 at a position shown in FIG. 2a. Thus, the selector sleeve 47 is not engaged with the teeth 48 of the transfer gear 30. Therefore, the vehicle is driven under a viscous coupling operating mode.

During such a driving mode, the torque is transmitted to the rear wheels through final reduction gear 23, transfer gear 30, viscous coupling 35, transfer shaft 26, rear drive shaft 28, and propeller shaft 29. When the speed difference between the front and rear wheels is small, outer discs 41 in the viscous coupling 35 slip with respect to inner discs 40 to transmit a smaller torque to the rear wheels than to the front wheels. If the front wheels skid, the housing 37 operatively connected to the front wheels rotates much faster than the hub 36. A large difference of the rotational speeds between the inner discs 40 and outer discs 41 generates a transmitting torque which is transmitted to the lower speed side, namely to the inner discs 40. Thus, the rear torque is increased and the front torque is reduced so that four wheel driving is provided.

When the vehicle is driven on a rough road, the driving torque $T_D$ increases and exceeds the predetermined torque $T_S$ ($T_D > T_S$). Thus, the viscous coupling lock deciding section 60 produces a lock signal to energize the solenoid 62c to open the vacuum port 62b of solenoid operated valve 62. Accordingly, vacuum is applied to the actuator 52 to move the diaphragm 52a and hence slide the rail 49 to the right. The selector sleeve 47 is forced by the fork 50 to slide to the right, thereby engaging the teeth 48 as shown by a chain line in FIG. 2a. Accordingly, the transfer gear 30 is operatively connected to the shaft 26, and the housing 37 is locked to the shaft 26. The torque is transmitted from the final reduction gear 23 to the transfer shaft 26 through the transfer gear 30, selector sleeve 47 and hub 46. Thus, the directly connected four wheel driving mode is established. Under the driving mode, the torque is constantly and equally distributed to the front and rear wheels so that preferable characteristics of the four wheel driving are effected at the start of the vehicle and on rough roads.

The present invention may be applied to motor vehicles having other engine and transmission arrangements than the illustrated embodiment or to a vehicle having an automatic transmission. The lock device 45 may be disposed between the hub 36 and the housing 37. Furthermore, the lock device 45 may be driven by a line pressure of the automatic transmission, or by an oil pressure applied by a pump driven by the engine.

In accordance with the present invention, a viscous coupling provided in a power transmitting system is automatically locked when it is preferable to equally distribute the torque to four wheels of a vehicle. Thus, the durability of the viscous coupling and driveability on rough roads are improved and fuel consumption can be decreased.

While the presently preferred embodiments of the present invention have been shown and described, it is to be understood that this disclosure is for the purpose of illustration and that various changes and modifications may be made without departing from the spirit and scope of the invention as set forth in the appended claims.

What is claimed is:

1. A power transmitting system for a four-wheel drive vehicle having an engine, and a transmission for transmitting power of the engine to main driving wheels of the vehicle, the power transmitting system comprising:

a viscous coupling for transmitting the power therethrough to auxiliary driving wheels of the vehicle;

a lock device provided for locking said viscous coupling to directly transmit the power to the auxiliary driving wheels;

detector means for detecting driving conditions of the vehicle and for producing driving condition signals;

calculator means for calculating driving torque of the power transmitting system based on the driving condition signals;

comparator means for comparing the calculated driving torque with a predetermined driving torque and for producing an output signal when the calculated driving torque exceeds the predetermined driving torque; and an actuator means responsive to said output signal for operating said lock device to lock the viscous coupling;

said calculator means calculates the driving torque as engine torque multiplied by the gear ratio of the transmission multiplied by a final reduction gear ratio divided by a constant for effective radius of tires.

2. The system according to claim 1 wherein the lock device is provided to lock a housing of the viscous coupling to a shaft of the viscous coupling.

3. The system according to claim 2 wherein the actuator means is a vacuum operated actuator having a chamber defined by a diaphragm.

4. The power transmitting system according to claim 1, wherein the lock device is mounted between a transmission final reduction gear and a housing of the viscous coupling for locking the housing of the viscous coupling to a hub of the viscous coupling.

5. The power transmitting system according to claim 1, wherein said predetermined driving torque is dependent on gripping force of the tires.

6. The power transmitting system according to claim 1, wherein said transmission and viscous coupling having gears such that when the viscous coupling is locked the engine torque is equally distributed to the main and auxiliary driving wheels.

7. A power transmitting system for a four-wheel drive vehicle having an engine, and a transmission for transmitting power of the engine to main and auxiliary driving wheels of the vehicle, respectively, a viscous coupling provided between an output of the transmission and the auxiliary driving wheels, and selecting means for directly transmitting the power to the auxiliary driving wheels bypassing said viscous coupling, the improvement in the system comprising gear ratio providing means for detecting a gear ratio of the transmission and for producing a gear ratio signal, engine torque calculating means for calculating engine torque responsive to an operating condition of the engine and for producing an engine torque signal, calculating means responsive to the gear ratio and engine torque signals for calculating a driving torque of the system and for producing a driving torque signal, comparator means for comparing the driving torque with a predetermined driving torque and for producing an output signal when the calculated driving torque exceeds the predetermined driving torque, and an actuator means responsive to said output signal for actuating said selecting means to bypass the viscous coupling so as to directly transmit the power of the engine to the auxiliary driving wheels.

8. The power transmitting system according to claim 7, wherein said engine torque calculating means calculates engine torque from the position of a throttle of the engine and engine speed as said operating condition of the engine.

* * * * *